Figure 1:
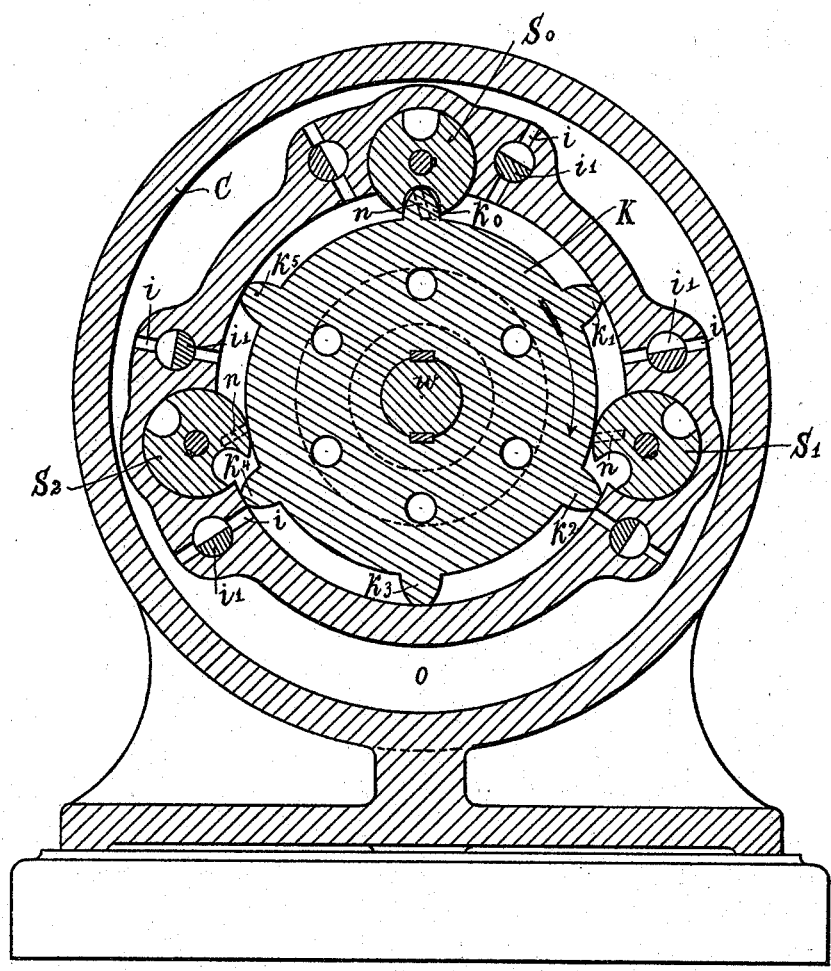

(No Model.) 4 Sheets—Sheet 1.

A. A. KRYSZAT.
ROTARY ENGINE.

No. 571,377. Patented Nov. 17, 1896.

*Fig: 1.*

Witnesses
H. van Oldenneel
E. A. Scott

Inventor
Albert August Kryszat
by Richardson
Attorneys (No Model.) 4 Sheets—Sheet 2.
A. A. KRYSZAT.
ROTARY ENGINE.
No. 571,377. Patented Nov. 17, 1896.

Witnesses
H. van Oldenneel
E. A. Scott

Inventor
Albert August Kryszat
by Richardson
Attorneys (No Model.) 4 Sheets—Sheet 3.
A. A. KRYSZAT.
ROTARY ENGINE.

No. 571,377. Patented Nov. 17, 1896.

Fig: 3.

(No Model.) 4 Sheets—Sheet 4.

A. A. KRYSZAT.
ROTARY ENGINE.

No. 571,377. Patented Nov. 17, 1896.

Witnesses
H. van Oldenneel
E. A. Scott

Inventor
Albert August Kryszat
by Richards
Attorneys

UNITED STATES PATENT OFFICE.

ALBERT AUGUST KRYSZAT, OF ASCHERSLEBEN, GERMANY.

ROTARY ENGINE.

SPECIFICATION forming part of Letters Patent No. 571,377, dated November 17, 1896.

Application filed October 16, 1895. Serial No. 565,863. (No model.) Patented in Luxemburg April 5, 1895, No. 2,275; in France April 9, 1895, No. 246,512; in Belgium April 10, 1895, No. 115,004; in England April 10, 1895, No. 7,342; in Italy April 23, 1895, No. 38,727; in Finland May 17, 1895, No. 570; in Canada May 27, 1895, No. 49,034; in Hungary June 21, 1895, No. 3,064; in Spain June 25, 1895, No. 17,268, and in Austria August 8, 1895, No. 45/2,804.

*To all whom it may concern:*

Be it known that I, ALBERT AUGUST KRYSZAT, engineer, a subject of the Emperor of Germany, and a resident of Aschersleben, in the Empire of Germany, have invented certain new and useful Improvements in Rotary Engines, of which the following is a full, clear, and exact description.

This invention has been patented to me in Austria August 8, 1895, No. 45/2,804; in Hungary June 21, 1895, No. 3,064; in Luxemburg April 5, 1895, No. 2,275; in France April 9, 1895, No. 246,512; in Belgium April 10, 1895, No. 115,004; in England April 10, 1895, No. 7,342; in Spain June 25, 1895, No. 17,268; in Italy April 23, 1895, No. 38,727; in Finland May 17, 1895, No. 570, and in Canada May 27, 1895, No. 49,034.

This invention relates to a rotary engine provided with a number of inlet and outlet ports, tooth-like longitudinal rails or ledges on the periphery of the piston, and rotary valves acting as abutments, the arrangement of such elements being such that the motive fluid acting between the ledges of the piston is so utilized that at each revolution the piston works partly at full pressure and partly with expansion simultaneously. Hence the working of the engine is not only quite uniform, but the consumption of steam or other fluid employed is most economical. The live steam is admitted through a steam-pipe into annular passages in each end plate of the cylinder, such steam-pipe being provided with a valve which can be turned so as to admit the steam either into the left or right end plate, and thus causing the piston to rotate in the forward or backward direction accordingly. The exhaust-steam is carried off through special valves arranged near the rotary valves, such exhaust-steam being thus led off into a steam-jacket formed by the double walls of the cylinder.

Figure 2:
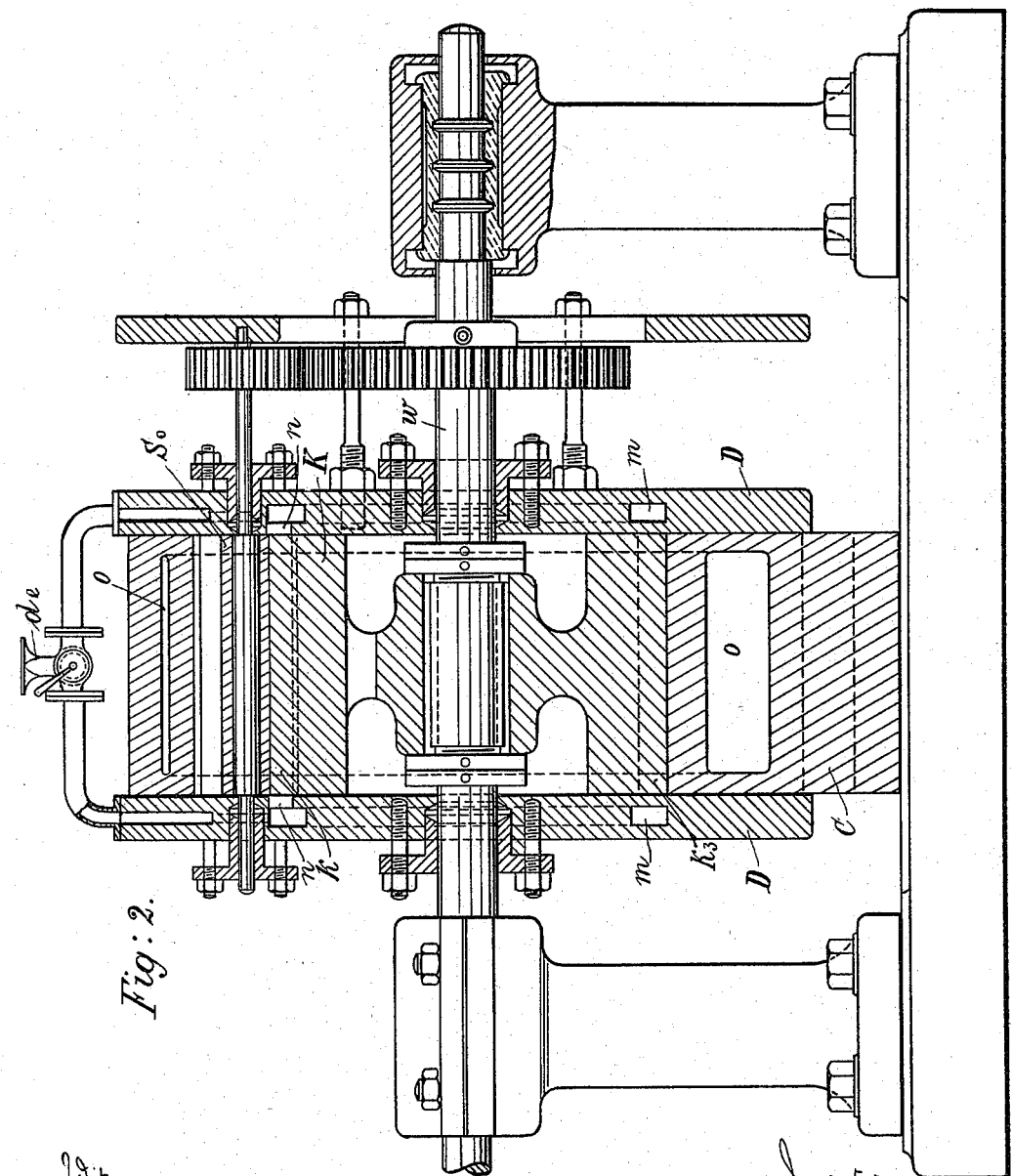
Figure 3:
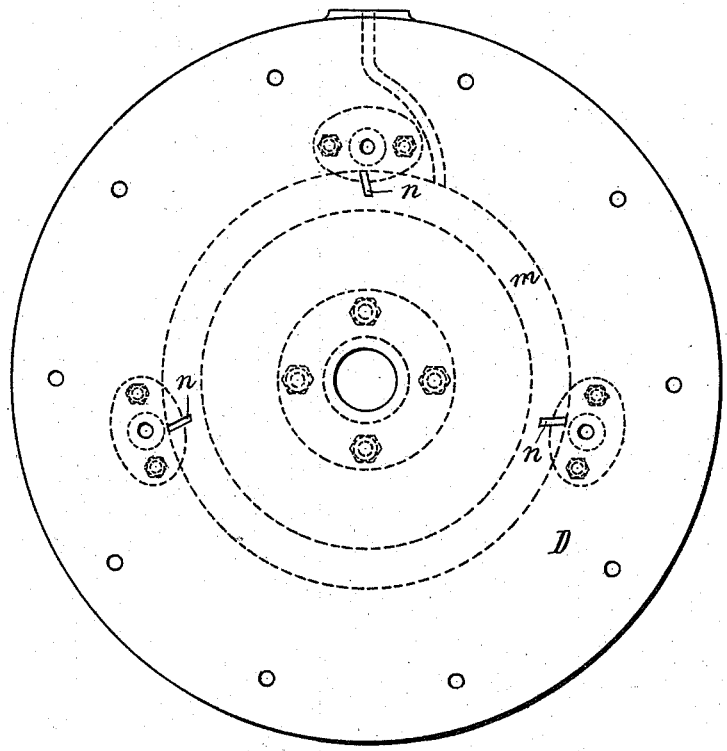
Figure 4:
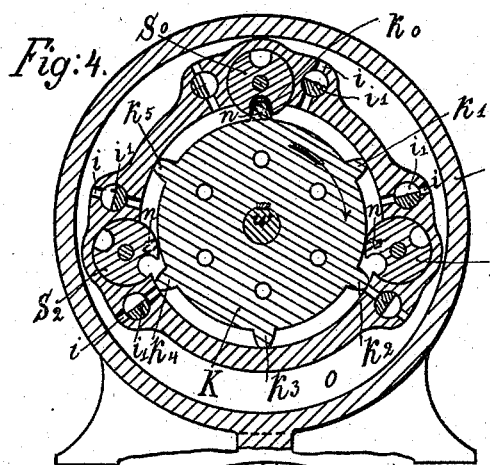

Referring to the accompanying drawings, Figure 1 shows the engine in cross-section. Fig. 2 is a longitudinal section of same. Fig. 3 is an elevation of the inside face of one of the end plates of the cylinder. Figs. 4 to 9 illustrate in cross-sectional views the various positions of the rotary valves relatively to the steam-inlet ports.

The engine comprises a double-walled cylinder C, in which rotates the piston K, keyed onto the shaft W, the whole being inclosed by the end plates D D.

Teeth or ledges $K^0$ to $K^5$, on which the steam acts, are arranged at equal distances apart on the periphery of the piston and parallel to the shaft $w$. The rotary valves $S^0$ $S'$ $S^2$ are mounted in the wall of the cylinder, which is suitably strengthened or enlarged at such parts. These rotary valves act at the same time as abutments for the motive fluid and are composed of cylindrical cast bodies with two longitudinal passages of suitable cross-section, in which passages the teeth $K^0$ to $K^5$ exactly mesh or engage.

The rotary valves are driven from without the cylinder by pinions mounted on their shafts and engaging with a pinion keyed onto the main shaft $w$. The circumferential velocity of the piston to that of the rotary valves is about one to three, as in the example shown in the drawings. The relation of the piston to the valves is determined by the number of valves and teeth with which the engine is provided.

The steam is admitted to the cylinder by means of the rotary valves $S^0$ $S'$ $S^2$ in the following manner: In the example shown in the drawings the passages $m$ $m$ in both end plates D D and leading from the steam-inlet governed by three-way cock $d$ $e$ communicate with the cylinder through ports $n$. These steam-inlet ports $n$ are so formed that they are opened and closed by the teeth $K^0$ to $K^5$. Moreover such ports are oppositely arranged in the two end plates D D of the cylinder. Hence the respective ports are covered in due order and in the same manner by said teeth whether the engine is rotating from left to right or in reverse direction, according as the live steam is admitted into the left or right end plate.

For engines working in one direction only the passages $n$, communicating with the annular passage in one of the end plates, may be dispensed with. Such annular passage is then preferably made to communicate with the steam-jacket direct.

A valve $i'$ for the exhaust-steam is provided at each side of the rotary valves. In case the engine is to rotate in the direction shown by the arrow in Fig. 1 the valves $i'$ are so arranged that the exhaust-steam in front of the teeth $K^0$ to $K^5$ may escape, the latter being thus subjected to the full pressure of the steam immediately they have passed the rotary valves $S^0$ $S'$ $S^2$.

Figure 5:
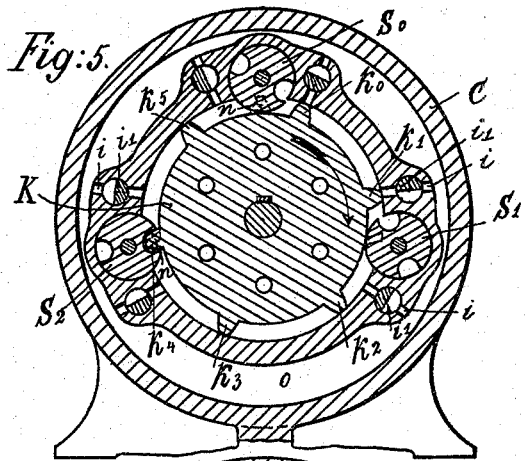
Figure 6:
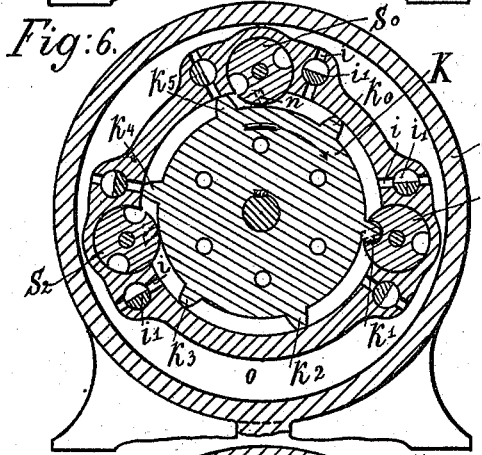
Figure 7:
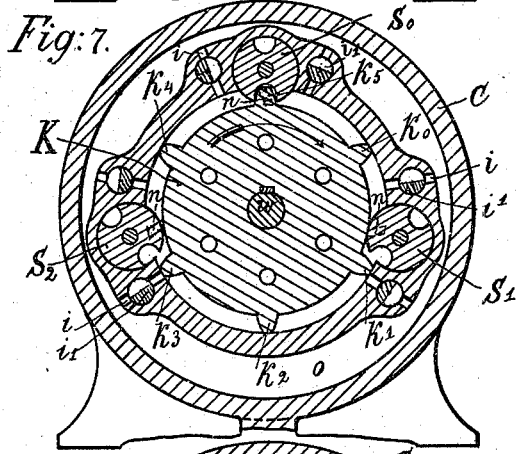
Figure 8:
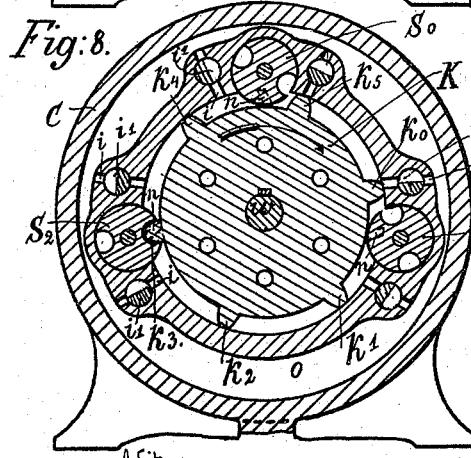
Figure 9:
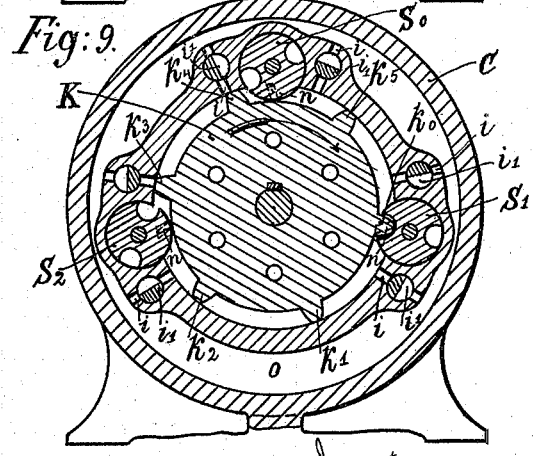

Figs. 4 to 9 illustrate the relative positions of the teeth $K^0$ $K'$, &c., to the rotary valves $S^0$ $S'$ $S^2$ during a complete revolution of the piston. In the position shown in Fig. 4, $K^0$ is covering the steam-inlet $K^2$ in the first period of expansion and $K^4$ just on the point of closing the steam-inlet. Fig. 5: $K^0$ is in the first and $K^2$ the second stage of expansion; $k^4$ is over the steam-inlet. Fig. 6: $K^0$ is commencing the second stage of expansion, $K^2$ is at the end of the second expansion, and $K^4$ enters the first stage of expansion. Fig. 7: $K^5$ is over the steam-inlet, $K'$ in the first stage of expansion, and $K^3$ just about to cover the steam-inlet. Fig. 8: $K^5$ is commencing the first period of expansion and $K'$ the second period, while $K^3$ is in the cutting-off position. Fig. 9: $K^5$ is commencing the second stage of expansion, $K'$ at the end of the second expansion, and $K^3$ at the end of the full-pressure period and the commencement of the first stage of expansion.

When the piston is rotating in the opposite direction, the several relative positions of the teeth and valves are reversed in exactly the same order.

The engine is reversed by shutting off the steam by means of three-way cock $d$ $e$, such steam entering the cylinder through the left end plate and thus causing the same to enter the other end plate. The steam thus passes through the aforementioned oppositely-arranged inlet-ports $n$ and causes the piston to rotate in the reverse direction.

It will be evident that any desired number of piston teeth or ledges and rotary valves may be used, according to the size of the motor, the power to be developed, and the expansive force of the motive fluid employed. It follows, therefore, that the larger the dimensions of the engine, whereby a correspondingly larger number of rotary valves and teeth are required, the better will be the results attained than is possible with smaller engines of this type.

Having now particularly described and ascertained the nature of this invention, I declare that what I claim, and wish to secure by Letters Patent, is—

In combination in a rotary engine, the piston provided with projecting teeth, the rotary abutments having grooves to receive the said teeth, a pair of exhaust-valves, one on each side of the rotary abutment, the end casings each having a steam-passage therein, the steam-inlet openings leading from each of the said steam-passages and extending laterally into the steam-space of the cylinder, an exhaust-steam space extending circumferentially about the cylinder through which the exhaust-ports extend and means for supplying steam to either of the end passages and cutting off the other passage as desired.

In witness whereof I have hereunto signed my name in the presence of two subscribing witnesses.

ALBERT AUGUST KRYSZAT.

Witnesses:
ARTHUR BAERMANN,
FRANZ KOLLM.